United States Patent [19]
Girard et al.

[11] Patent Number: 5,900,214
[45] Date of Patent: * May 4, 1999

[54] DEVICE FOR DELIVERING ANY ONE OF A PLURALITY OF GASES TO AN APPARATUS

[75] Inventors: Jean-Marc Girard, Paris; Alain Mail, Domene; Yves Marot, Buc, all of France

[73] Assignee: L'Air Liquide, Societe Anonyme pour l'Etude et l'Exploitation des Procedes Georges Claude, France

[*] Notice: This patent is subject to a terminal disclaimer.

[21] Appl. No.: 08/746,345

[22] Filed: Nov. 8, 1996

[30] Foreign Application Priority Data

Jun. 18, 1996 [FR] France ................... 96 07560

[51] Int. Cl.$^6$ ................. G01N 33/00; B01L 11/00; H01J 49/04
[52] U.S. Cl. ............... 422/62; 422/83; 422/93; 422/103; 73/31.03; 137/599; 137/597
[58] Field of Search ............... 422/50, 59, 62, 422/83, 93, 100, 103; 137/883, 599, 597; 73/31.03, 1 G

[56] References Cited

U.S. PATENT DOCUMENTS

| | | | |
|---|---|---|---|
| 3,019,815 | 2/1962 | Lenardon et al. | 137/612.1 |
| 5,055,260 | 10/1991 | Roberge et al. | 422/62 |
| 5,065,794 | 11/1991 | Cheung | 137/883 |
| 5,139,225 | 8/1992 | Olson et al. | 251/61.2 |
| 5,205,322 | 4/1993 | Merick et al. | 137/597 |
| 5,246,668 | 9/1993 | MacCallum et al. | 422/93 |
| 5,305,630 | 4/1994 | Molozay et al. | 73/1 G |
| 5,438,001 | 8/1995 | Ohmi et al. | 436/34 |
| 5,447,053 | 9/1995 | Ohmi et al. | 73/31.03 |
| 5,587,519 | 12/1996 | Range et al. | 73/1 G |

FOREIGN PATENT DOCUMENTS

| | | |
|---|---|---|
| 1259605 | 1/1968 | Germany. |
| 4-147052 | 5/1992 | Japan. |
| 624038 | 8/1978 | U.S.S.R.. |
| 91/00460 | 1/1991 | WIPO. |

OTHER PUBLICATIONS

G.M. Ozanne et al. *Anesthesiology 1981*, 55, 62–70.
B. Hori et al. *Ind. Eng. Chem. Fundam.* 1985, 24, 397–389.
R.C. Hutton et al, *J. Anal. At. Spectrom.* 1990, 5, 463–466.
S. Bohatka et al. *Vacuum 1993*, 44, 669–671.
R. Periasamy et al. *J. Electrochem. Soc.* 1994, 141, 1653–1657.
B. R. Stallard et al. *J. Electrochem. Soc.* 1995, 142, 2777–2782.

*Primary Examiner*—Arlen Soderquist
*Attorney, Agent, or Firm*—Burns, Doane Swecker & Mathis, L.L.P.

[57] ABSTRACT

A device for delivering one of a plurality of gases to an apparatus includes at least two valves. Each valve includes a first conduit permanently connected by one end thereof to an associated sampling line and, by another end thereof, to an associated purge line. Each valve includes a second conduit and an actuator which can be switched between bringing the first conduit into communication with the second conduit and a position for isolating the first conduit from the second conduit. At least the second conduit is free of flow-stagnation volumes. The second conduits of the valves are placed in series in a common line for delivering gas to the apparatus. The end of the common line opposite the apparatus emerges in an associated purge line. Each purge line passes through an element for creating a pressure drop. A use of the device is as a feed for an ionization mass spectrometer.

19 Claims, 3 Drawing Sheets

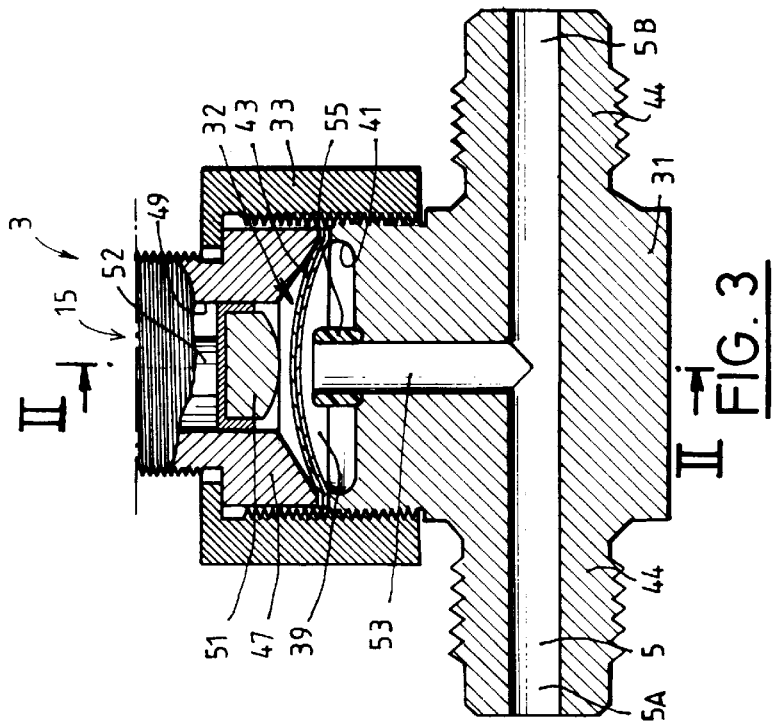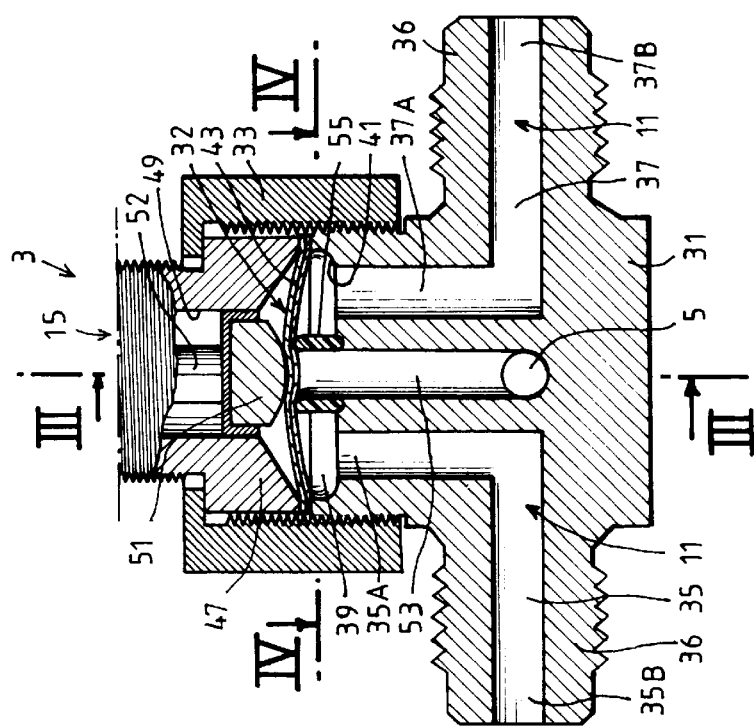

DEVICE FOR DELIVERING ANY ONE OF A PLURALITY OF GASES TO AN APPARATUS

BACKGROUND AND SUMMARY OF THE INVENTION

The invention relates to a device for delivering any one of a plurality of gases to an apparatus, especially a trace-impurity analyzer such as an atmospheric-pressure ionization mass spectrometer.

In the field of the analysis of very-high pure gases, it is increasingly necessary to analyze using the same analyzer, sequentially and with a short switching time, gases coming from various sampling lines.

In this case, the gases contained in the sampling lines may be of various kinds, or may be of the same kind but sampled at various points in a plant, for example in a plant for fabricating semiconductor components.

A gas delivery device is known in which each sampling line is connected to a common gas delivery line which itself is connected to the analyzer. A shutoff valve is placed in each of the sampling lines.

In order to select a gas to be analyzed, which comes from a particular sampling line, the shutoff valves of the other sampling lines are closed and only the valve in the sampling line selected is switched to the open state.

This known system has the drawback that the flow stagnates in the blocked sampling lines, which causes undesirable interactions with the walls of the pipe of the line, such as desorption or adsorption phenomena, for example.

In addition, this known device has, downstream of the shutoff valves, flow-stagnation volumes in which gases accumulate. Each time a switch is made from one sampling line to another and consequently each time the gas to be analyzed is changed, the gases which have accumulated in these flow-stagnation volumes contaminate the new gas to be analyzed, and a considerable amount of time is required to remove them. It may therefore be understood that it is impossible to produce short switching times with such a gas delivery device.

The present invention aims to alleviate these various drawbacks by providing a gas delivery device which does not have a flow-stagnation volume in the common gas delivery line, which allows continuous purging of each of the sampling lines and rapid switching from one gas to be analyzed to another, while still ensuring that the gases conveyed to the analyzer are rapidly representative.

To this end, the subject of the invention is a device for delivering any one of a plurality of gases to an apparatus, comprising at least two valves each connected, on the one hand, to a respective gas sampling line and, on the other hand, to a common line for delivering gas to the apparatus, characterized in that each valve comprises a first conduit permanently connected via one end to the respective sampling line and via its other end to a respective purge line, a second conduit and an actuator which can be switched between a position for bringing the first conduit into communication with the second conduit and a position for isolating the first conduit from the second conduit, at least the second conduit being free of flow-stagnation volumes, the second conduits of the valves are placed in series in the common gas delivery line, the end of this common line, opposite said apparatus, emerging in an additional purge line and each purge line passes through an element for creating a pressure drop.

The device according to the invention may include one or more of the following characteristics:

the second conduit of each valve includes a chamber in which emerges at least one conduit connecting the first conduit to said chamber and each valve includes a closure element on which the actuator of the valve acts, which closure element, in said isolating position, closes off the end of the connecting conduit emerging in said chamber and which is set back with respect to this end of the conduit in said communicating position;

the end of the connecting conduit emerging in said chamber is provided with a seal projecting into the chamber and the closure element comprises an elastically deformable diaphragm forming part of the wall of the chamber opposite the seal, the diaphragm being pressed in a sealed manner onto the seal against the spring force of the diaphragm, in said isolating position, by a pusher of the actuator;

each purge line includes a respective element for creating a pressure drop;

all the purge lines are connected, downstream of the elements for creating a pressure drop, to a common evacuation line;

the sampling lines and the additional purge line each include an element for creating a pressure drop, the purge lines associated with each valve are joined into a common purge line, the common purge line includes a diverter for setting a constant pressure in the common gas delivery line;

at least one element for creating a pressure drop is a flow-regulating element;

each flow-regulating element is formed by a gaged orifice;

each valve includes means for controlling the switching of the actuator between said communicating and isolating positions, the means for controlling each valve are connected to a control unit for isolating each valve or for bringing it into communication, and the control unit includes logic means which prevent the simultaneous switching of several actuators in the communicating position.

BRIEF DESCRIPTION OF THE DRAWINGS

Other characteristics and advantages of the invention will emerge from the following description given by way of example but having no limiting character, with regard to the appended drawings in which:

FIG. 2 is a sectional view, on the line II—II in FIG. 3, of a valve of the device according to the invention in FIG. 1, in the isolating position;

FIG. 3 is a sectional view, on the line III—III in FIG. 2, of the same valve in the communicating position;

DETAILED DESCRIPTION

Figure 1:
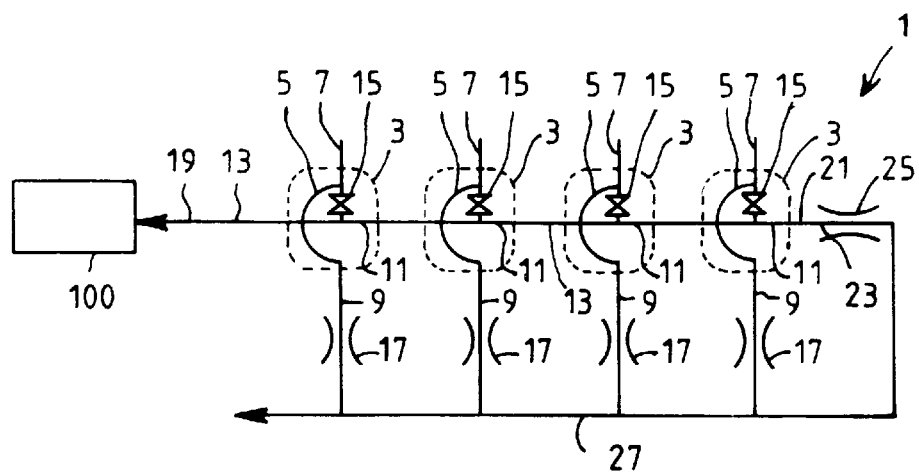
FIG. 1 is a diagram of the device according to the invention for delivering any one of a plurality of gases to an apparatus.

As may be seen in FIG. 1, the gas delivery device 1 comprises four valves 3, shown diagrammatically surrounded by dashes.

Each valve comprises a first conduit 5 which is permanently connected via one end to an associated sampling line 7 and via its other end to an associated purge line 9.

It furthermore comprises a second conduit 11 which is placed in a common line 13 for delivering gas to an apparatus 100 such as, for example, an analyzer for analyzing trace impurities in a gas, of the atmospheric-pressure ionization mass spectrometer type.

The first conduit 5 and the second conduit 11 of each valve 3 may be brought into communication by means of an actuator 15, as will be explained in detail hereinbelow, which can be switched between a position for bringing the first conduit 5 into communication with the second conduit 11 and a position for isolating the first conduit 5 from the second conduit 11.

Each purge line 9 associated with a valve 3 includes its own element 17 for creating a pressure drop. The latter is advantageously formed by a flow-regulating element, for example a gaged orifice, for setting the flow rate of the flow in each sampling line 7, through the first conduit 5 of the valve 3, toward the purge line 9.

The common gas delivery line 13 has an end 19 intended to be connected to the apparatus 100. The end 21 of the common line 13, opposite the end 19 and said apparatus 100, emerges in an additional purge line 23. This additional purge line 23 includes an element 25 for creating a pressure drop. This element is advantageously formed by an element for regulating the flow rate in the additional purge line 23, for example a gaged orifice.

The purge lines 9 associated with the valves 3, as well as the additional purge line 23, are all connected, downstream of the elements 17 and 25 for creating a pressure drop, to a common evacuation line 27.

Structure of the valves of the device:

An embodiment example of the valves 3 fitted in the gas delivery device 1 will be described in detail hereinbelow. Such valves, of the electropolished DAD type, are marketed, for example, by the company NUPRO and manufactured by the company SWAGELOK.

As shown in FIGS. 2 and 3, the valve 3 includes a body 31, in which are produced the first conduit 5 and the second conduit 11, a closure member 32 and an actuator 15, shown in part, which is screwed onto the body 31 by means of a nut 33.

The second conduit 11 (FIG. 2) is formed by two conduit sections 35 and 37 and by an axisymmetric annular chamber 39. Emerging in a lateral part of the bottom of this chamber 39 is one 35A 37A of the two ends of each conduit section 35, 37.

The other end, 35B, 37B of each conduit section 35, 37 emerges in a respective lateral connector 36 of the body 31. These ends 35B and 37B are diametrically opposed. The two connectors 36 are intended to be connected to the common gas delivery line 13.

The chamber 39 is formed by a substantially cylindrical recess 41, made in the upper face of the body 31, and by the closure member 32. This closure member itself consists of a combination of two diaphragms 43 which cover the recess 41 and constitute the upper wall of the chamber 39.

The diaphragms 43 are made of an elastically deformable material, for example metal. Each diaphragm 43 is a disk, the central part of which is domed in a direction away from the body 31. The edge of the diaphragms 43 is clamped in a sealed manner between the annular edge of the recess 41 and an annular edge of a holding piece 47 which forms part of the actuator 15. The piece 47 is made in the form of a dish so as to allow movement of the domed part of the diaphragms 43.

In its central part, opposite the diaphragms 43, the holding piece 47 includes a guide bore 49 in which a pusher 51 driven by a rod 52 of the actuator 15 can slide.

The first conduit 5 of the valve 3 is a simple straight hole which extends perpendicularly to the axis defined by the ends 35B, 37B of the conduit sections 35, 37.

Each end 5A, 5B of the first conduit 5 also emerges in a respective lateral connector 44 on the body 31. One of the two ends of the first conduit 5 is intended to be connected to an associated sampling line, and the other to an associated purge line.

The first conduit 5 may be connected to the chamber 39 via a connecting duct 53 which emerges in the center of the recess 41.

The end of the duct 53 emerging in the recess 41 includes a cylindrical seal 55 which is forcibly fitted into the body 31 of the valve and which projects into the chamber 39.

Figure 4A:
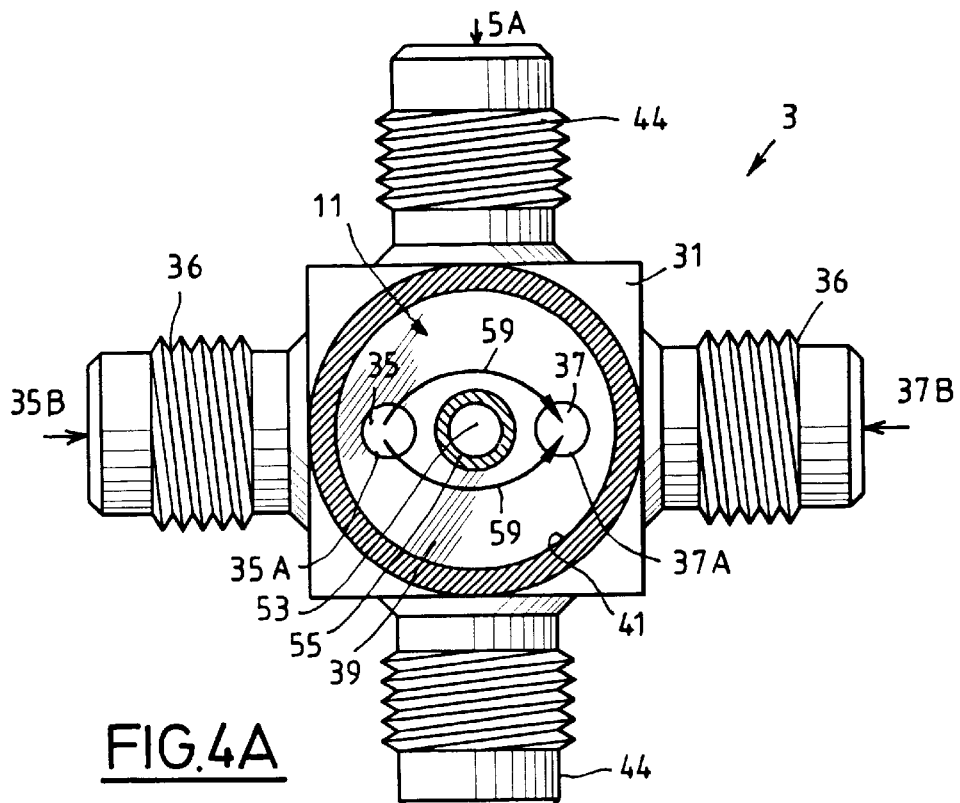
FIG. 4A is a sectional view, on the line IV—IV in FIG. 2, of the valve in the isolating position.

FIGS. 2 and 4A show the valve 3 in the position for isolating the first conduit 5 from the second conduit 11. In such a case, the central part of the diaphragms 43 is pressed in a sealed manner by the pusher 51 onto the seal 55 so that the duct 53 is isolated from the chamber 39.

Nevertheless, a gas introduced into the second conduit 11 of the valve flows freely, for example from the conduit section 35 into the chamber 39 and then into the conduit section 37, as shown by the arrows 59 in FIG. 4A. It is clear that the second conduit 11 of the valve thus formed has no flow-stagnation volume.

In the case of isolating the second conduit 11 from the first conduit 5, the first conduit 5 has only a very small stagnation volume, corresponding to the volume of the duct 53.

Figure 4B:
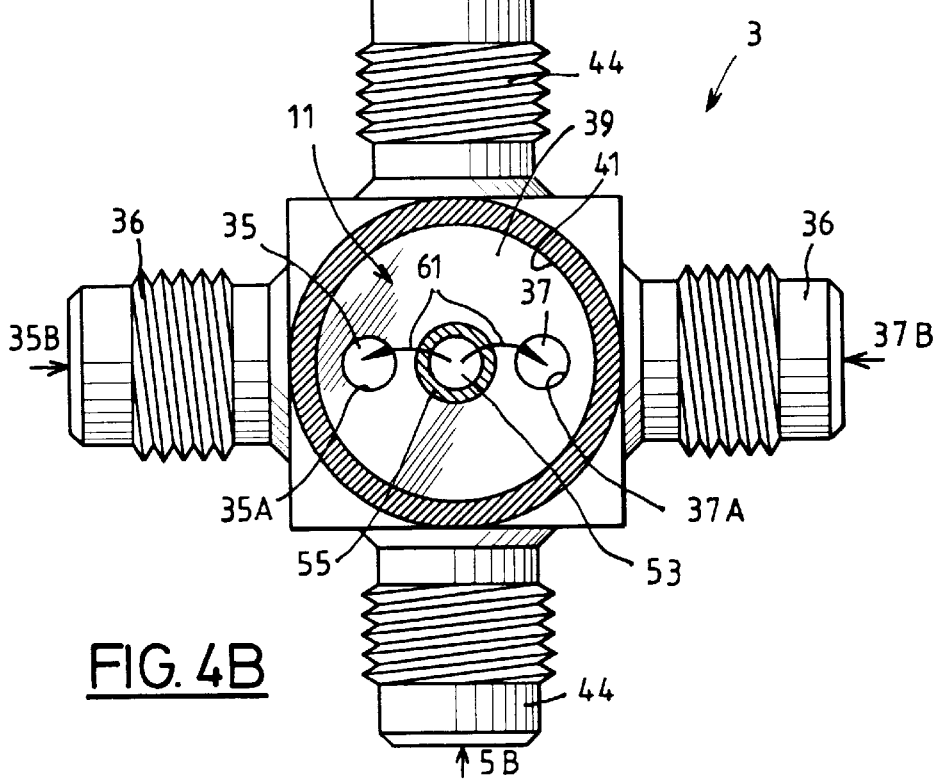
FIG. 4B is a sectional view, on the line IV—IV in FIG. 2, of the valve in the communicating position.

FIG. 3 and FIG. 4B correspond to a position for bringing the first conduit 5 into communication with the second conduit 11. In such a case, the pusher 51 is set back. The diaphragms 43 resume their initial domed shape by virtue of their spring force. Consequently, a free space is formed between the diaphragms 43 and the seal 55 so that the gases flowing in the first conduit 5 flow away via the duct 53 into the chamber 39 and then into the two sections 35 and 37 of the second conduit 11, as shown by the arrows 61 in FIG. 4B.

Operation of the gas delivery device:

The operation of the gas delivery device 1 will be explained hereinbelow with regard to FIG. 1. During operation of the device, a single valve 3 is in the state in which its first conduit 5 is in communication with its second conduit 11. All the other valves 3 are in the state in which their first conduit 5 is isolated from their second conduit 11.

By virtue of the shape in which the first conduit 5 of each valve is produced, the flow of the gases in the sampling lines 7 through the first conduit, toward the purge line 9, is permanently maintained with a certain flow rate, which is determined by the gaged orifice 17 placed in the purge line 9.

Only the flow of gas coming from the sampling line 7 of the valve in the communicating state runs out through the duct into the chamber of the valve and thereafter into the common gas delivery line 13, in both directions as was described hereinabove with regard to FIG. 4B.

By virtue of the fact that the end 19 of the common line 13 is connected to the apparatus 100 and that the other end emerges in an additional purge line 23, this common gas delivery line 13 is also continuously flushed in both directions. It therefore has no flow-stagnation volume.

In order now to choose a gas coming from another sampling line 7, the first conduit 5 is isolated from the second conduit 11, by means of the corresponding actuator 15, of the valve hitherto in the communicating state, and another valve 3 is brought into the communicating state. The new gas to be analyzed will flush in both directions, in the delivery line 13, the gases which were still previously present. Since the two conduits 11 of each valve 3 do not have a stagnation volume, the gases which were previously analyzed are effectively and rapidly evacuated. Thus, a short switching time is produced and the new gas to be analyzed is quickly representative.

Figure 5:
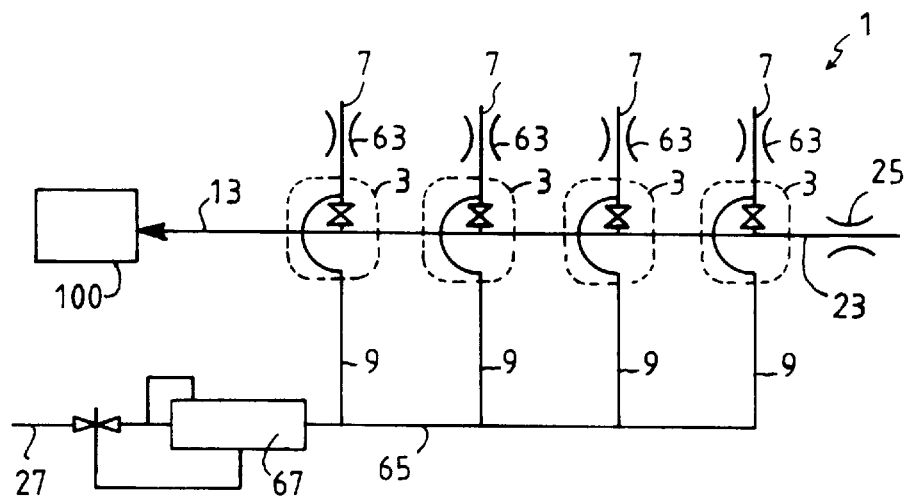
FIG. 5 is a diagram of a variant of the device according to the invention for delivering any one of a plurality of gases to an apparatus.

A variant of the gas delivery device 1 is shown in FIG. 5. This device 1 is distinguished from that shown in FIG. 1 by the fact that the regulation of the flow rates in the sampling lines 7 is carried out upstream of the valves 3 and not downstream, as was described with regard to FIG. 1.

For this purpose, elements 63 for creating a pressure drop, preferably flow-regulating elements, for example gaged orifices, are placed in the sampling lines 7. The purge lines 9 associated with each valve 3 are joined together into a common purge line 65.

This common purge line 65 includes, downstream of the connections to the purge lines 9, a diverter 67 which controls the pressure upstream of the purge lines 9 and, consequently, in the common gas delivery line 13. By means of such an arrangement, a constant-pressure flow is delivered to the apparatus. Of course, this assumes that the sources of the various gases, upstream of the elements 63, are at a sufficient pressure.

If FIG. 1 illustrated one embodiment of the invention in which each purge line 9 passes through an element 17 for creating a pressure drop, which is a respective element specific to each line, it may therefore be observed that this FIG. 5 for its part illustrates another embodiment of the invention in which each purge line 9 passes through an element (67) for creating a pressure drop, which element may be termed a common element since it lies on the common purge line 65/27.

Advantageously, in order to switch between the various sampling lines, diaphragm valves are used which include means for controlling the switching of the actuator between the communicating and isolating positions, such as, for example, pneumatic valves or electromagnetic-operated valves. The means for controlling the movement of the actuator of each valve are connected to a control unit, such as, for example, a microcomputer or a logic controller. This control unit includes switching logic means. These logic means are produced, for example, by a computer program loaded into the microcomputer, which excludes the possibility of two diaphragm valves being simultaneously in the communicating state.

In the case of pneumatic valves, it is advantageous to provide for at least one of the valve actuators to operate in a "normally open" situation since, in the case of an interruption in the electric supply, the gas contained in the sampling line connected to this valve, preferably an inert gas, passes into the common gas delivery line and feeds the analyzer. This thus avoids any transient pressure or flow-rate regime leading to desorption or adsorption phenomena which require a long purge time in order to reestablish equilibrium in the common gas delivery line.

What is claimed is:

1. Device for delivering any one of a plurality of gases to an apparatus, comprising:

a purge line provided with an element for creating a pressure drop;

a common gas delivery line having a first end for being connected to and delivering gas to an apparatus, and a second end connected to the purge line;

at least two valve assemblies, each valve assembly of the at least two valve assemblies including a valve, a respective sampling line, and a respective valve assembly purge line, each valve of each valve assembly including a first conduit permanently connected at a first end thereof to the respective sampling line and, at a second end thereof, to the respective valve assembly purge line, a second conduit, and an actuator disposed between and connecting the first conduit and the second conduit, the actuator being switchable between a first position for bringing the first conduit into communication with the second conduit and a second position for isolating the first conduit from the second conduit, at least the second conduit being free of flow-stagnation volumes, each second conduit of each valve of the at least two valve assemblies being placed in series in the common gas delivery line; and one or more second elements for creating a pressure drop in flow communication with the valve assembly purge line of each valve assembly.

2. Device according to claim 1, wherein, for each valve, the second conduit includes a chamber and a connecting conduit connecting the first conduit to the chamber, and each valve includes a closure element on which the actuator of the valve acts, the closure element, when the actuator is in the second position, closing an end of the connecting conduit, the closure element being set back with respect to the end of the connecting conduit in when the actuator is in the first position.

3. Device according to claim 2, wherein the end of the connecting conduit is provided with a seal projecting into the chamber, and the closure element comprises an elastically deformable diaphragm forming part of a wall of the chamber opposite the seal, the diaphragm being pressed in a sealed manner onto the seal against a spring force of the diaphragm, when the actuator is in the second position, by a pusher of the actuator.

4. Device according to claim 1 wherein each of the valve assembly purge lines of each valve assembly includes a respective one of the one or more second elements for creating a pressure drop.

5. Device according to claim 4, wherein the purge line and each of the valve assembly purge lines of each valve assembly are all connected, at points downstream of the element for creating a pressure drop and downstream of the respective ones of the second elements for creating a pressure drop, to a common evacuation line.

6. Device according to claim 4, wherein at least one of the element for creating a pressure drop and the respective ones of the one or more second elements for creating a pressure drop is a flow-regulating element.

7. Device according to claim 6, wherein the flow-regulating element is formed by a gaged orifice.

8. Device according to claim 1, further comprising a common purge line in which a third element for creating a pressure drop is provided, wherein the valve assembly purge line of each valve assembly joins into the common purge line such that the valve assembly purge line of each valve assembly is in flow communication with the third element for creating a pressure drop.

9. Device according to claim 1, further comprising a common purge line in which a third element for creating a pressure drop is provided, the third element for creating a pressure drop being in the form of a diverter for setting a constant pressure in the common gas delivery line, wherein the sampling line of each valve assembly includes one or more of the one or more second elements for creating a pressure drop, and the valve assembly purge line of each valve assembly joins into the common purge line such that the valve assembly purge line of each valve assembly is in flow communication with the third element for creating a pressure drop.

10. Device according to claim 1, wherein each valve includes means for controlling the switching of the actuator between the first and second positions, the controlling means being connected to a control unit for isolating or bringing into communication each valve, the control unit including logic means for preventing simultaneous switching of more than one actuator of the valves of the at least two valve assemblies in the first position.

11. Device for delivering any one of a plurality of gases to an apparatus, comprising:

a purge line;

a common gas delivery line having a first end for being connected to and delivering gas to an apparatus, and a second end connected to the purge line;

at least two valve assemblies, each valve assembly of the at least two valve assemblies including a valve, a respective sampling line, and a respective valve assembly purge line, each valve of each valve assembly including a first conduit permanently connected at a first end thereof to the respective sampling line and, at a second end thereof, to the respective valve assembly purge line, a second conduit, and an actuator disposed between and connecting the first conduit and the second conduit, the actuator being switchable between a first position for bringing the first conduit into communication with the second conduit and a second position for isolating the first conduit from the second conduit, at least the second conduit being free of flow-stagnation volumes, each second conduit of each valve of the at least two valve assemblies being placed in series in the common gas delivery line; and a common purge line, the valve assembly purge lines of each valve assembly joining into the common purge line.

12. Device according to claim 11, wherein the common purge line joins the purge line.

13. Device according to claim 11, wherein an element for creating a pressure drop is provided in the common purge line.

14. Device according to claim 13, wherein the element for creating a pressure drop is a diverter for setting a constant pressure in the common purge line.

15. Device according to claim 13, wherein the purge line is provided with a second element for creating a pressure drop.

16. Device according to claim 15, wherein each sampling line of each valve assembly is provided with a third element for creating a pressure drop.

17. Device according to claim 11, wherein the purge line is provided with an element for creating a pressure drop.

18. Device according to claim 11, wherein each sampling line of each valve assembly is provided with an element for creating a pressure drop.

19. Device according to claim 11, wherein the purge line passes through an element for creating a pressure drop and each sampling line of each valve assembly is provided with a second element for creating a pressure drop.

* * * * *